United States Patent [19]

Helmstetter

[11] Patent Number: 4,886,548

[45] Date of Patent: Dec. 12, 1989

[54] FIREPROOFING OF BUILDING MATERIALS

[75] Inventor: John G. Helmstetter, Brick, N.J.

[73] Assignee: Core-Guard Industries, Inc., Asbury Park, N.J.

[21] Appl. No.: 337,941

[22] Filed: Apr. 14, 1989

[51] Int. Cl.$^4$ .......................... C09D 5/16; C09D 1/02
[52] U.S. Cl. ................................... 106/18.12; 106/74; 106/84
[58] Field of Search ................ 106/74, 84, 18.12, 38.3

[56] References Cited

U.S. PATENT DOCUMENTS

| | | | |
|---|---|---|---|
| 2,065,757 | 12/1936 | Scott | 106/75 |
| 4,312,673 | 1/1982 | Neely | 106/74 |

*Primary Examiner*—Theodore Morris
*Attorney, Agent, or Firm*—Stephen W. White

[57] ABSTRACT

A novel and stable coating solution for fireproofing building materials is described. This solution is easy to apply and will reduce the propensity of burnable materials to sustain combustion. Alternatively, the solution may be used as a part of the solution used to cast paper on the surface of paper containing wallboard and the like. The solution finds particular use in fireproofing of wall boards and the like.

4 Claims, No Drawings

FIREPROOFING OF BUILDING MATERIALS

BACKGROUND OF THE INVENTION

1. Field of the Invention

This invention relates to the application of a novel coating on building materials in order to impart a resistance to the combustion thereof. More particularly, this invention relates to the fireproofing of wall board and the like.

2. Discussion of the Prior Art

A number of elements that are used during the construction of buildings and the like are combustible. These materials include wood and other cellulosic materials that are included within the construction site. For example, wood is commonly used as the frame work on which a building is erected. Also, wallboards and the like are used either as a sub wall or as the finished wall itself. Since most of these materials are highly flammable, care must be taken during the construction and during the occupation thereof to prevent fires.

It has been a long, sought-after goal to provide fireproofing for some of these combustible materials. These goals have not been achieved in the prior art and therefor, a host of materials with a somewhat lower combustion point are conventionally used. Some of these include the so-called sheet-rock which is made from a cardboard/paper surface material over a cementitious or gypsum like material that is treated with a salt solution to reduce the combustion point or impart some minimal level of fireproofing. Still, these materials can burn as is evidenced by a variety of stories well-known in the prior art. Thus, houses and other buildings built with these materials are still subject to combustion if a fire occurs. There are no known coatings or fireproofing materials known in the prior art for application to building materials to accomplish a relatively complete fireproofing thereof.

SUMMARY OF THE INVENTION

It is an object of this invention to provide a solution that can be applied to building materials to impart fireproofing thereto. Another object is to provide a solution that is easy to apply, is compatible with the environment and not harmful to humans. These and yet other objects are achieved by providing coating solution for application on building materials comprising two parts, Part A, the first part comprising an equal mixture of three liquid silicates of varying viscosities with the following composition:

(a) a solution of about 8.9% $Na_2O$ and about 28.7% $SiO_2$ and having a specific gravity of between 35–40° Baume;

(b) a solution of about 11.0% $Na_2O$ and about 31.7% $SiO_2$ and having a specific gravity of between 40–50° Baume; and, (c) a solution of about 8.3% $K_2O$ and about 20.8% $SiO_2$ and having a specific gravity of between 65–85° Baume; and Part B, the second part comprising an aqueous mixture of equal amounts of acetic acid, borax, kaolin, zinc oxide and sodium bicarbonate.

DETAILED DESCRIPTION OF THE INVENTION

As is well known, mixtures of silicates can impart some fire resistance when applied or coated on flammable materials. Other salts are also known to impart fire resistance. However, the coating composition of this invention is extremely stable, has excellent adhesion to wallboard, wood and the like, and will impart a tremendous resistance to combustion. These results are truly amazing.

In the preparation of the coating solution of this invention, I first make up a mixture of the liquid silicates of varying viscosities (called Part A). These ingredients are stirred thoroughly to insure that a blend the silicates is obtained. The ingredients of the second mixture (called Part B) is made by mixing equal parts of acetic acid (which is added to enhance curing of the mixture), borax (which is also added to enhance curing), kaolin or clay (which is added to give the mixture body and texture), zinc oxide (which is added to impart water proofing tendencies), and sodium bicarbonate (which is added to improve agitation and mixing) to water. It is necessary to heat Part B to a temperature of 150° F. or more in order to properly obtain the requisite mixing both of Part B and with Part B into Part A. After mixing both Parts, the solution is ready to apply to a building material to impart resistance to combustion thereto. This application can be accomplished by any conventional means such as spraying, brushing, dipping, wiping, etc. After application, the heretofore combustible building material has a considerable reduced propensity to support combustion and can truly be considered as fireproof.

Combustible building materials such as wallboards, woods, trim work and the like may all be treated and rendered essentially fireproof using the novel mixture of this invention. In addition to enhancing the fire resistance of these materials, the propensity to attract vermin such as termites is also greatly reduced by the use of this novel mixture.

Most of the ingredients of my novel, fireproofing solution are readily obtainable in the prior art and from commercial sources. The liquid silicate mixtures are also commercially obtainable. For example, these can be purchased from the PQ Corporation of Valley Forge, PA. and are termed "PQ ® Soluble Silicates, Type SS-N ®, Type SS-C ® and Type Kasil ®-1, for example. They are conventional, syrupy-like liquids, soluble in water.

In addition to the aforesaid ingredients, which are necessary to impart fire-resistance as stated, certain other ingredients may be added for other purposes. For example, formamide may be added to thin the solution out and glycols such as ethylene glycol acetate and glycerol mono-, di- and triacetates added to impart a resistance to freezing. This is particularly needed when the solutions of this invention are to be applied in colder climate or under adverse, freezing conditions. Various salts such as calcium or sodium chloride may be added to increase the requisite temperature range at which this solution may be used. In order to increase the surface tension, magnesium or aluminium sulfates or polyvinyl acetates may be added thereto. Hydrogen peroxide may be added to bleach colorants that may be present such as titanium dioxide or aluminum pigments. Preservatives such as urea formaldehyde may also be included. The aforesaid ingredients are not a requisite part of the solution but may be only added if required to perform some other task.

A particularly preferred mixture of ingredients to achieve the requisite fireproofing solution for application to building materials was made up as follows:

Part A: (by weight)

One (1) part (24 oz.) PQ SS-N ®
One (1) part (12 oz.) PQ SS-C ®
One (1) part (12 oz.) PQ K ®-1

These ingredients were stirred thoroughly to insure intimate mixing.

Part B: (by weight)
Six (6) parts (48 oz.) water
2 oz. each of the following ingredients:
  Acetic Acid
  Borax
  Kaolin
  Zinc Oxide
  Sodium Bicarbonate These ingredients were mixed thoroughly at 150° F. for about 8-10 min. Then, Part B was added to Part A and stirred to mix thoroughly.

Part B represents an important part of this novel fireproofing solution of this invention since it is imperative to achieve stability and increase the shelf-life. Equal parts of each ingredient are required, though the level in amount by weight may vary from 1 to 16 oz. Satisfactory results have thus been achieved over a wide range of these ingredients. Each ingredient plays an important role in the mixture and adds value as described above.

The application method to wallboard and the like is not important, only that it be applied in a sufficient quantity and cured to become effective. The solution, as previously mentioned, may be applied to the building materials directly on the construction site, for example. Alternatively, during the fabrication of the wallboard containing, for example, paper cast on the surface thereof, the solution may be incorporated within the structure thereof by using the novel fireproofing solution of this invention as part of the aqueous material used to cast the paper. Fireproofing will still be maintained. Application of the mixture over the wallboard will enhance the application of subsequently applied decorative materials such as paint, wallpaper and the like.

In a test demonstrating the efficacy of the fireproofing solution of this invention, prepared as described above, a wall board (½ inch sheet-rock) was taken as a typical building material. A sample was left untreated while another sample was treated with the solution of this invention. In order to test for combustibility, a propane blow torch was used. The flame of this torch will produce a temperature of about 2500° F. This torch was applied to both the treated and untreated wall board samples.

Factory specifications require that ½ inch sheet-rock survive for about 30 minutes under a flame of about 1400° F. Under the condition of this test, using the hotter flame of a propane torch, the factory treated wall board produced a noxious smoke in about 7 minutes. Within 12 minutes, the gypsum had cracked and the fire carried through onto the reverse surface.

The sample treated with the solution of this invention, however, produced no noxious smoke and contained the fire without cracking for more than 18 minutes. Thus, it can be assumed that an enclosure made from wall board treated with the fireproofing material of this invention would safely contain a fire and would not permit passage of the fire from that enclosure to another. Thus, if a fire did occur in one room, and if the building materials of that room had been treated according to this invention, fire would not spread from room to room. This in itself is an important discovery since fire is known to spread rapidly from room to room once started. Since the materials treated with the novel fireproofing solution of this invention will not support combustion, fire loss is reduced. And, since these materials will contain any fire which might start, further losses are minimized.

In yet another test, several pieces of wallboard (e.g. gypsum sheet-rock, ca. ½" thick) were treated with the aforesaid fireproofing solution and allowed to dry. These pieces were tested under a 2500° F. flame of the same blow torch described above. Samples which had been treated with the fireproofing solution showed no burn-through after more than 80 minutes under the flame while control samples burned through in about 15 minutes or less.

I claim:

1. A coating solution for application on building materials to achieve fireproofing thereof comprising two parts, Part A, the first part, comprising an equal mixture of three liquid silicates of varying viscosities with the following composition:
   (a) a solution of about 8.9% $Na_2O$ and about 28.7% $SiO_2$ and having a specific gravity of between 35-40° Baume;
   (b) a solution of about 11.0% $Na_2O$ and about 31.7% $SiO_2$ and having a specific gravity of between 40-50° Baume; and,
   (c) a solution of about 8.3% $K_2O$ and about 20.8% $SiO_2$ and having a specific gravity of between 65-85° Baume;

and Part B, the second part, comprising an aqueous mixture of equal amounts of acetic acid, borax, kaolin, zinc oxide and sodium bicarbonate.

2. The fireproofing solution of claim 1 wherein the ingredients of Part A are present in the amounts in parts by weight:
   (a) 24 oz.;
   (b) 12 oz.; and,
   (c) 12 oz.;

and the ingredients of Part B are present in the following amounts as parts by weight:
12 to 48 oz. of water and
1 to 16 oz. each of the following ingredients:
   Acetic Acid,
   Borax,
   Kaolin,
   Zinc Oxide, and,
   Sodium Bicarbonate.

3. The fireproofing solution of claim 2 wherein the ingredients in Part B are present in the following amounts in parts by weight:
24 oz. water and 2 oz. each of the following:
   Acetic Acid,
   Borax,
   Kaolin,
   Zinc Oxide, and,
   Sodium Bicarbonate.

4. The coating solution of claim 2 or 3 wherein the ingredients of Part B are mixed at 150° F. prior to being added to Part A.

* * * * *